Oct. 3, 1967 T. G. SAUNDERS 3,345,583
MULTIVIBRATOR HAVING ASTABLE AND BISTABLE OPERATING MODES
Filed May 23, 1966
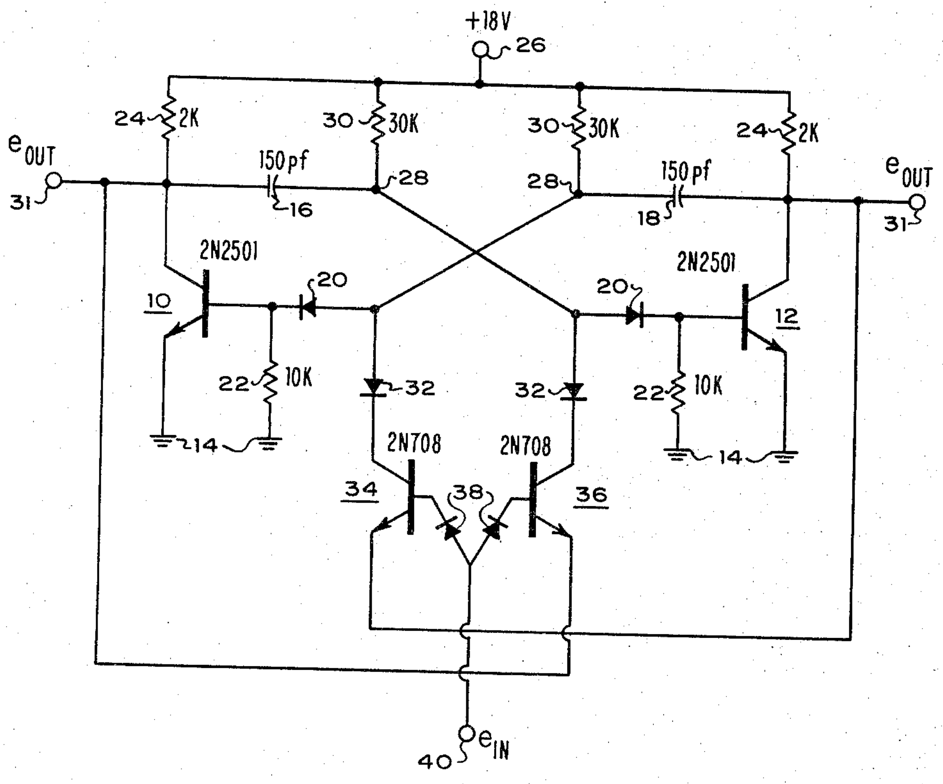
INVENTOR
TEDDY G. SAUNDERS
BY A.C. Smith
ATTORNEY 3,345,583
Patented Oct. 3, 1967

3,345,583

MULTIVIBRATOR HAVING ASTABLE AND BISTABLE OPERATING MODES

Teddy G. Saunders, 860 N. Humboldt, San Mateo, Calif. 94401

Filed May 23, 1966, Ser. No. 551,974
3 Claims. (Cl. 331—113)

ABSTRACT OF THE DISCLOSURE

A normally astable multivibrator in which additional feedback paths are activated in response to a control signal for stabilizing the astable operating states to provide a bistable operating mode.

This invention relates to multivibrators and has as its principal object the provision of a versatile multivibrator circuit which may be conveniently and simply operated in either an astable or a bistable mode.

This object is accomplished in accordance with the illustrated embodiment of this invention by connecting a gating transistor to each feedback path of an astable multivibrator and by applying a control signal of variable magnitude to the inputs of the gating transistors.

In the drawing, which shows a multivibrator circuit according to the preferred embodiment of this invention, there is shown an astable multivibrator comprising a pair of regeneratively coupled transistors 10 and 12, the emitters of which are connected in common to a source 14 of reference potential. The collector of transistor 10 is connected to the base of transistor 12 by a feedback path including a capacitor 16. Similarly, the collector of transistor 12 is connected to the base of transistor 10 by a feedback path including a capacitor 18. A diode 20 is included in each feedback path between the corresponding capacitor 16 or 18 and the base of the corresponding transistor 10 or 12. Each of the diodes 20 is poled in a direction to isolate the base to which it is connected from negative voltage swings which might otherwise break down the base-emitter junction of the corresponding transistor 10 or 12. A resistor 22 is connected between the base of each of the transistors 10 or 12 and the source 14 of reference potential for decreasing the rise time of the pulses generated by the multivibrator circuit. The collector of each of the transistors 10 and 12 is connected by a load resistor 24 to a source 26 of positive potential. The common terminal 28 between capacitor 16 or 18 and the diode 20 of each feedback path is connected by a timing resistor 30 to the source 26 of positive potential so that for the circuit values indicated in the drawing the multivibrator circuit will normally free run at a frequency of three hundred and sixty kilocycles per second. In this free-running or astable mode of operation the multivibrator circuit alternates between two unstable electrical states in the first of which, for example, the transistor 10 is heavily conductive of current and the transistor 12 is substantially nonconductive of current and in the second of which the transistor 10 is substantially non-conductive of current and the transistor 12 is heavily conductive of current. The output voltage of the multivibrator circuit may be obtained at output terminal 31 connected to the collector of either transistor 10 or 12.

This conventional astable multivibrator is modified by connecting the common terminal 28 of each feedback path through a different diode 32 to the collector of a different gating transistor 34 or 36. These diodes 32 serve to isolate the gating transistors 34 and 36 from the negative voltage swings which might otherwise cause a spurious oscillation. The emitter of gating transistor 34 is connected to the collector of transistor 12 and the emitter of gating transistor 36 is connected to the collector of transistor 10. The base of each of the gating transistors 34 and 36 is connected through a different diode 38 to an input terminal 40. Each of the diodes 38 is poled to isolate the base to which it is connected from negative voltage swings which might otherwise break down the base-emitter junction of the corresponding gating transistor 34 or 36. In the circuit shown, when a control voltage $e_{in}$ applied to the input terminal 40 is equal to or less than the reference voltage, gating transistors 34 and 36 are open circuits and the multivibrator circuit operates in its normal astable mode. When the control voltage $e_{in}$ is raised to a selected positive voltage level one of the gating transistors 34 or 36 will conduct depending on the conductive state of the transistors 10 and 12. For example, if transistor 12 is in the heavily conducting state at the time the voltage $e_{in}$ is raised from the level of the reference voltage to the level of the selected positive voltage, gating transistor 34 conducts through transistor 12. This conduction of gating transistor 34 clamps the base of transistor 10 and locks the astable operation of the multivibrator circuit. Thus, capacitor 18 becomes fully charged and capacitor 16 uncharged so that the multivibrator circuit changes state when $e_{in}$ is again lowered to, for example, the level of the reference voltage. If $e_{in}$ is pulsed from the level of the selected positive voltage to the level of the reference voltage for a time less than the free-running frequency of the astable mode, the multivibrator circuit operates in a bistable mode. The output voltage $e_{out}$ produced during operation of the multivibrator circuit in this bistable mode may be obtained at either output terminal 31.

I claim:

1. A multivibrator circuit having both astable and bistable operating modes, said multivibrator circuit comprising:
   - first and second gain elements, each of said gain elements having an input and an output;
   - means including a first feedback circuit connecting the output of said first gain element to the input of said second gain element and including a second feedback circuit connecting the output of said second gain element to the input of said first gain element for alternately operating said gain elements in a first unstable operating state in which said first gain element is in a high conductivity condition and said second gain element is in a low conductivity condition and in a second unstable operating state in which said second gain element is in the high conductivity condition and said first gain element is in the low conductivity condition to provide the astable operating mode;
   - first and second switching elements; and
   - means including said first switching element and connecting the output of said first gain element to the input of said second gain element for providing a third feedback circuit therebetween and means including said second switching element and connecting the output of said second gain element to the input of said first gain element for providing a fourth feedback circuit therebetween, each of said switching elements being responsive to a control signal during a different one of said operating states for rendering that operating state stable to provide the bistable operating mode.

2. A multivibrator circuit as in claim 1 wherein:
   - said first and second gain elements comprise first and second transistors, each of said transistors having a base as its input and a collector as its output;
   - said first feedback circuit comprises means including a first capacitor for connecting the collector of said first transistor to the base of said second transistor;

said second feedback circuit comprises means including a second capacitor for connecting the collector of said second transistor to the base of said first transistor;

said first and second switching elements comprise third and fourth transistors, each of said third and fourth transistors having a base, an emitter, and a collector;

said third feedback circuit comprises said third transistor and means for connecting the emitter of said third transistor to the collector of said first transistor on one side of said first capacitor and for connecting the collector of said third transistor to the base of said second transistor on the other side of said first capacitor; and said fourth feedback circuit comprises said fourth transistor and means for connecting the emitter of said fourth transistor to the collector of said second transistor on one side of said second capacitor and for connecting the collector of said fourth transistor to the base of said first transistor on the other side of said second capacitor.

3. A multivibrator circuit as in claim 2 including means for connecting the bases of said third and fourth transistors in common for receiving the control signal.

References Cited

UNITED STATES PATENTS

| | | | |
|---|---|---|---|
| 3,142,025 | 7/1964 | Roberts | 331—113 |
| 3,245,003 | 4/1966 | Chomicki | 331—113 |

OTHER REFERENCES

Saunders, Ted: Electronic Design, "Modified Astable Multivibrator also Operates in Bistable Mode," pp. 48, 49, Dec. 20, 1965.

JOHN KOMINSKI, *Primary Examiner.*